March 24, 1970  MASASHI HAYASE ET AL  3,502,838
MULTIPLE STATION BRAZING DEVICE
Filed July 24, 1967  2 Sheets-Sheet 2

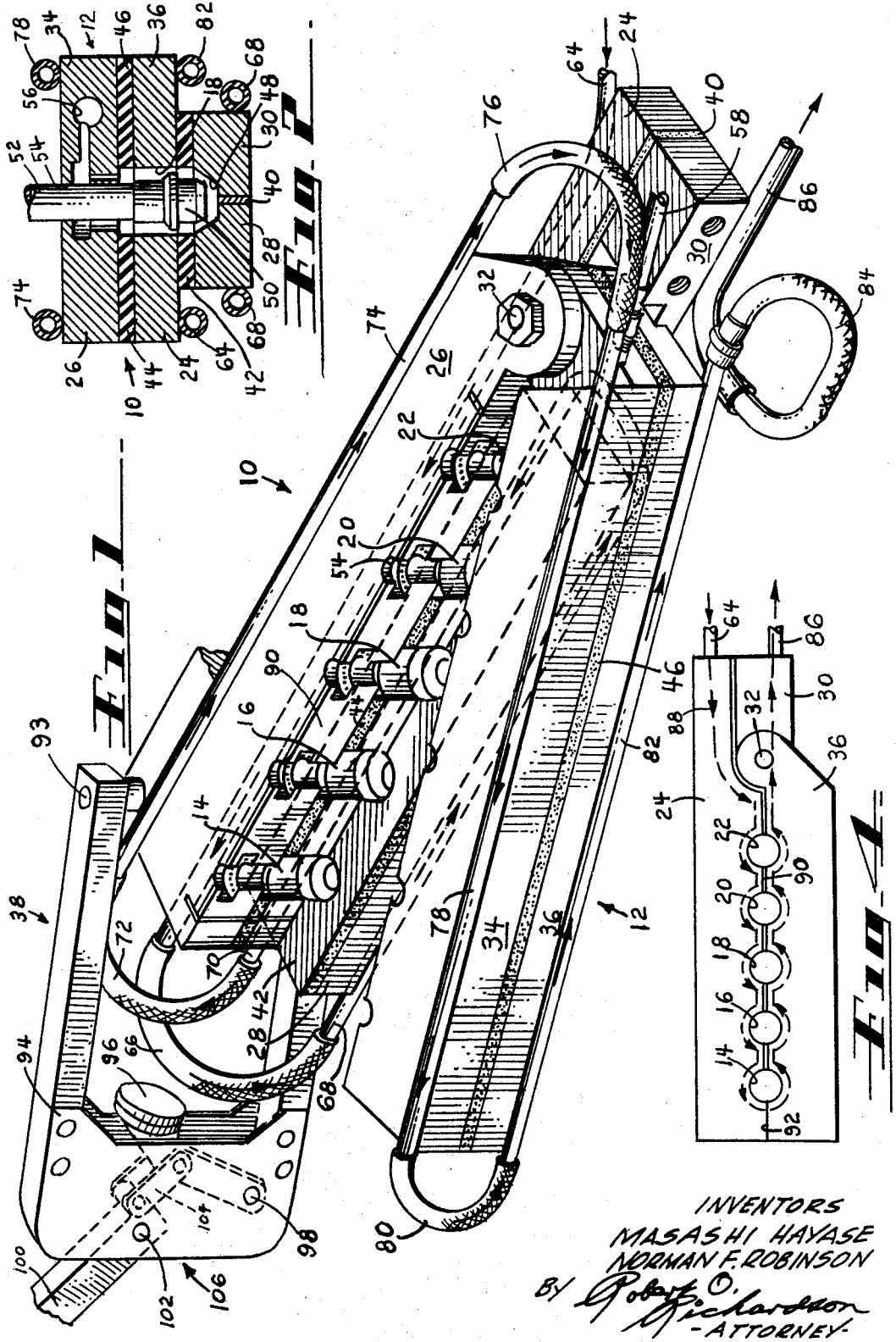

INVENTORS
MASASHI HAYASE
NORMAN F. ROBINSON
BY Robert O. Richardson
ATTORNEY

United States Patent Office 3,502,838
Patented Mar. 24, 1970

3,502,838
MULTIPLE STATION BRAZING DEVICE
Masashi Hayase, Fountain Valley, and Norman F. Robinson, Manhattan Beach, Calif., assignors to McDonnell Douglas Corporation, a corporation of Maryland
Filed July 24, 1967, Ser. No. 655,500
Int. Cl. B23k 13/00
U.S. Cl. 219—9.5                                9 Claims

ABSTRACT OF THE DISCLOSURE

A multiple station brazing tool to facilitate the production of brazed tube connections, capable of brazing several connections at once. Inert gas shields, RF energy and chill blocks are used as in their co-pending application.

CROSS REFERENCES TO RELATED APPLICATIONS

This application relates to the subject matter of co-pending patent application, S.N. 567,944, filed July 26, 1966, for Induction Heating Tool, now Patent No. 3,428,796, and reference is made to the information therein as though fully set forth herein below.

BACKGROUND OF THE INVENTION

The field of this invention is in the brazing of tubes and their associated couplings and connectors.

The welding, brazing or soldering of joints and inner connections between tubes and their associated couplings have obvious advantages over the use of threaded connections, particularly where the joint must be made fluid-tight and be permanent in nature. One such method is that of brazing with an induction heating of the joint until a filler metal melts and forms a bond with the base metal and thus integrally connects the tubes with their associated connections. Induction heating is done by passing an alternating electric current through a coil. The workpiece is placed within the coil and the eddy currents induced in the workpiece by the changing magnetic field causes the workpiece to become heated. The brazing is performed in an inert atmosphere to prevent oxidation and contamination which would reduce the effectiveness of the braze. To prevent the coil from over-heating, water or other cooling fluid may be used to transfer heat therefrom without interference with the heat generation on the part to be brazed.

In the above referred-to co-pending application, a multi-purpose clamp and chill block holds the tube and fittings firmly and accurately within the induction coil for uniform heating. This block conducts heat away from the tube to prevent or limit the annealing of heat-treated or work-hardened tubes, so that the heat-affected zone is limited mainly to that portion of the tube inserted into and reinforced by the fitting. A gaseous source is provided for a one-way flow to purge the induction heating area of air. The gas may be inert or chemically active, as desired. Locating spacers are provided to precisely locate the brazing fitting within the tool and to utilize the narrow heat zone generated by the tool.

SUMMARY OF THE INVENTION

The present invention is an improvement over the co-pending application in that provisions are made for brazing several connections at once. This significantly reduces the average time for connection for inert gas purging, heating and cooling. In one arrangement, several tube segments can be simultaneously brazed to appropriate end fittings, such as tube nut sleeves, unions, bulkhead fittings, or other types. The number of heating points is determined by the need and power source available. In another arrangement, the simultaneous brazing of the three connections of a T-fitting can be done in one operation. With appropriate adjustment and arrangement, a variety of fittings, such as a cross fitting, or fittings which include reducing type connections, may be brazed. The use of the single turn-type inductor, gas envelope and chill, as in the copending application, alleviates any temperature differential between the joints, and thus obtain brazed joints of consistent quality. The uneven heating at various points is generally the cause of failure of multiple station radio frequency induction brazing tools.

BRIEF DESCRIPTION OF THE DRAWINGS

FIGURE 1 is a perspective view of one form of multiple station brazing tool;

FIG. 2 is a sectional view taken through any of the several brazing stations;

FIG. 4 is a schematic illustration of the welding current path in the tool; and

Referring now to FIG. 1, there is shown a stationary portion 10 and a movable portion 12, which, when connected together, form a plurality of welding chambers 14, 16, 18, 20 and 22, within which tubes and couplings are positoined for brazing. Fixed portion 10 consists of a stationary coil half section 24, a stationary chill half section 26, a nose chill section 28, and a stub for movable coil half section 30. Pivotally mounted at pivot 32 is the movable portion 12 consisting of the hinged chill half section 34 and hinged coil half section 36. A closure fastener 38 retains the movable portion 12 in closed position during the brazing operation.

As can be seen, the stationary coil half section 24 and stub 30 are fastened together, with an insulating material, such as a disk 40 of tetrafluoroethylene, marketed by DuPont under the trademark "Teflon," for example, placed inbetween. Both the stub and the stationary coil half section are metallic and are conductors of electrical energy. Insulation 42 is placed on the top surface of nose chill section 28 to electrically insulate the nose chill section 28 from the stationary coil half section 24. Insulation 44 is placed between stationary chill half section 26 and stationary coil half section 24. In a similar manner, insulation 46 is placed between hinged chill half section 34 and hinged coil half section 36. Chambers 14, 16, 18, 20 and 22 are formed by the removal of semi-cylindrical portions from hinged coil half section 36 and stationary coil half section 24. Recesses 48, in nose chill section 28, accommodate connectors 50, which are to be brazed to tubes 52. As shown in FIG. 2, tubes 52 extend downwardly through apertures 54 formed by the removal of semi-circular portions from hinged chill half section 34 and stationary chill half section 26. As shown in FIG. 2, there is a bore 56 forming an inert gas manifold. This bore has an inert gas inlet 58 for providing an inert gas to the welding area in chamber 18. The construction of the movable and stationary chill half sections 34 and 26, can better be seen in FIG. 3. Apertures 54 extend throughout the thickness of these halves and ducts 58 interconnect them with the inert gas manifold 56. An enlarged annular recess 60 disperses the gas annularly around the aperture 54 and communicates inwardly through a plurality of passages 62 which communicate with the brazing chambers to permit the passage of the inert gas therein. Referring back to FIGS. 2 and 3, the water cooling passages can be seen. The path commences with water inlet 64 which extends along the lower portion of stationary coil half section 24 where it terminates in a plastic tube 66 which in turn is connected to U-shaped metallic tube 68 mounted to the bottom of nose chill section 28. End 70 is connected to plastic tube 72 which in turn is connected to a tube 74 extending along the top edge of stationary chill section 26. Plastic tube 76 connects tube 74 to tube 78 which extends along an upper edge of hinged chill half section 34. This tube is connected to plastic tube 80 which in turn is connected to tube 82 along the lower edge of the hinged coil half section 36. Plastic tube 84 interconnects tube 82 with the outlet tube 86 which is mounted on stub 30 of the fixed portion 10. The plastic inner-connections thus serve as insulators in order to provide an electrical current path that is shown in FIG. 4. Here is shown by the dotted arrow lines 88 the RF energy path enters water inlet 64 which is in electrical contact with the stationary coil half section 24, thus placing the half coil sections formed by the semi-circular portions of chambers 14, 16, 18, 20 and 22 in electrical series. An electrical insulator material 90 provides electrical insulation in between stationary coil half section 24 and removable coil half section 36, except at the furtherest end 92 where they are in abutting relationship, and thus in electrical contact. The other half of the chambers 14, 16, 18, 20 and 22 formed by the semi-circular surfaces on the movable coil half section 36 thus complete the circuit and energy and electrical energy path is completed through movable coil half section 36 to the stub 30 and then to water outlet 86.

Figure 5:
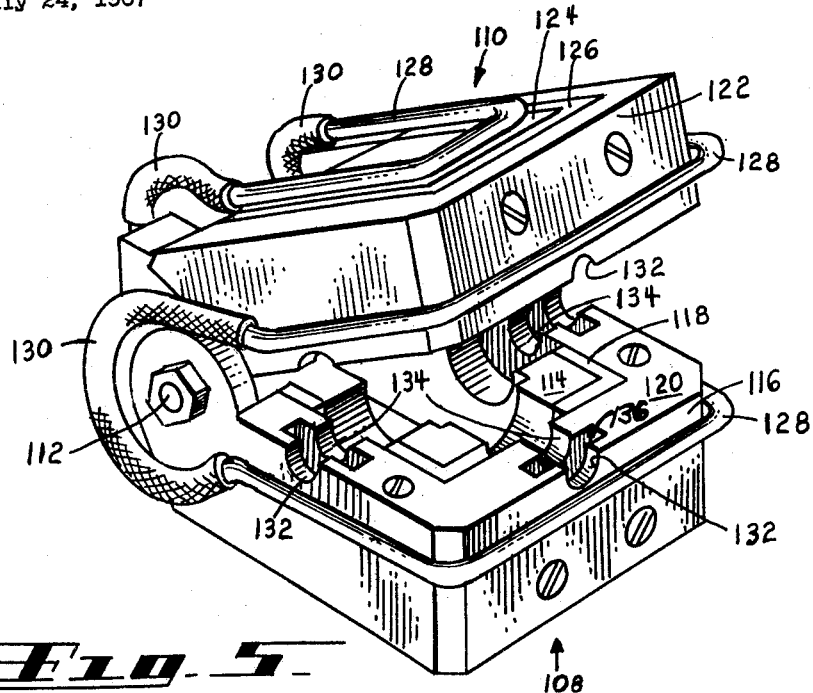
FIG. 5 is a perspective view of a modification wherein three stations are folded to form a welding tool for T-joints.
Figure 3:
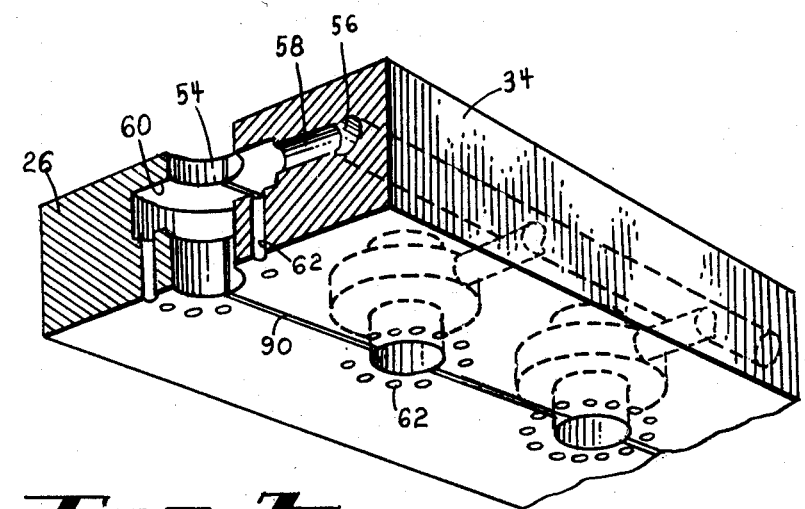
FIG. 3 is a perspective view partly in section showing the lower surface of the chill blocks.

In order to provide a good electrical contact at 92, between the stationary coil half section 24 and movable coil half section 36, the locking member 38 in FIG. 1 is provided. This member is pivotally mounted at 93 on the fixed portion 10 and is adapted to pivot over the end of the hinged movable portion 12 when the movable portion is in abutting relationship with the fixed portion 10. In such a position, the U-shaped member 94 swings over the outer edge of the movable portion 12 and pressure pad 96 is in contact with the outer surface. Contact member 96 is pivotally mounted at 98 on the U-shaped member 94. Locking handle 100 is also pivotally mounted on U-member 94 such as at pivot point 102. Appropriate linkage 104 innerconnects the locking handle 100 and the pressure pad 96, such that upward movement of handle 100 in the direction of arrow 106 causes the pressure pad 96 to pivot in a clockwise direction around pivot 98 and thus exert a clamping pressure against the movable portion 12 to thus provide good electrical contact with the fixed portion 10.

Reference is now had to an alternate embodiment shown in FIG. 5 wherein a multiple of three brazing stations are utilized in simultaneously brazing the three legs to a T-joint connector. Here there is shown a fixed portion 108 and a movable portion 110 pivotally connected at pivot 112. Fixed portion 108 consists of stationary chill block 114 and stationary coil half section 116 with insulation 118 therebetween. Insulation also is applied to the top surface 120 of the coil half section to electrically insulate it from the movable coil half section 122. The movable portion 110 consists of a movable coil half section 122, movable chill half section 124, with insulation 126 therebetween, in the same manner as is seen for fixed portion 108. Cooling tubes 128 are connected to the stationary end movable coil halves and chill blocks and are innerconnected by flexible tubes 130. The coil halves 116 and 122 have matching half apertures 132 and matching half coil surfaces 134 therein as well as chambers 136 for the distribution of the inert gas, all in the manner just described, with reference to the previous embodiment. As can be seen in the present embodiment, two brazing stations are in axial alignment and one station is perpendicular thereto in order that a T-joint may be fitted within the three brazing stations, and appropriate extensions welded thereto simultaneously. The coolant path passes through a lower inside coil loop (not shown), through the lower outside chill loop, upper chill loop and upper coil loop. The electrical path follows the lower coil haf, around the three sides, to a pivot contact (not shown) to the upper coil three sides, to a second pivot contact and thence to the electrical outlet. Although not shown, a suitable latching mechanism is used for retaining the movable and fixed portions in locked position for brazing. One similar to that shown in FIG. 1 may be used if desired.

From the foregoing description, it can be seen that by placing multiple brazing stations serially within the RF energy path, the brazing temperatures at the multiple stations will be uniform and all brazings will be of a uniform consistent quality.

It is to be understood that, having had the present invention thus disclosed, various modifications will readily occur to those skilled in the art and that it is to be understood that these deviations and variations from the embodiments just described are to be considered as part of the present invention.

We claim:
1. A multiple station brazing device comprising:
   a fixed portion having a plurality of stationary electrically conductive coil half sections, a plurality of stationary chill half sections and insulation therebetween,
   a movable portion pivotally connected at one end to said fixed portion,
   said movable portion having a plurality of movable coil electrically conductive half sections, a plurality of movable chill half sections and insulation therebetween,
   insulation between said stationary coil half sections and said movable coil half sections, said coil half sections having electrical contact at their ends opposite the pivotally connected ends thereof, and
   latching means for locking said fixed and movable portions in closed abutting position to maintain electrical contact between said coil half sections.

2. A multiple station brazing device as in claim 1, said chill half sections and said coil half sections having chambers formed therein whereby tubes and connectors may be placed therein for brazing.

3. A multiple station brazing device as in claim 1, each of said coil half sections having matching semi-cylindrical portions removed to define chambers into which tubing and connectors may be placed for brazing.

4. A multiple station brazing device as in claim 1, and a pluraltiy of nose chill sections mounted on said fixed portion,
   said coil half sections being positioned between said chill half sections and said nose chill sections whereby brazing heat is confined within said coil half sections.

5. A multiple station brazing device as in claim 1, said fixed portion and said movable portion having matching semi-cylindrical cavities defining cylindrical chambers for receiving tubes and connectors for brazing.

6. A multiple station brazing device as in claim 1,
   said latching means comprising a U-shaped member pivotally mounted on the end of said fixed portion and adapted to extend around said movable portion to retain said movable portion in abutment with said fixed portion,
   said member having a lever actuated pressure pad for urging the ends of said portions into electrical contact with each other.

7. A multiple station brazing device as in claim 3, said semi-cylindrical chambers forming serially connected electrical paths for transmission of RF energy for brazing said tubing and connectors.

8. A multiple station brazing device as in claim 1, and electrical inlet connections and liquid coolant connections on said fixed portion for energizing and cooling said device.

9. A multiple station brazing device as in claim 1 wherein said coil and chill sections comprise three brazing stations, two of which are in axial alignment and one is perpendicular thereto in order to receive the three legs of a T-joint for brazing thereof.

References Cited

UNITED STATES PATENTS

| | | | |
|---|---|---|---|
| 2,297,491 | 9/1942 | Meier | 219—9.5 X |
| 2,572,646 | 10/1951 | Menzel et al. | 219—9.5 X |
| 3,110,793 | 11/1963 | Worthington | 219—9.5 |
| 3,268,703 | 8/1966 | Schoppman et al. | 219—9.5 |
| 3,365,563 | 1/1968 | Basinger | 219—9.5 |
| 3,428,769 | 2/1969 | Ciszewski et al. | 219—9.5 |

OTHER REFERENCES

Multiple-Position Coils Speed Induction Heating, American Machinist, Oct. 23, 1947, p. 93.

JOSEPH V. TRUHE, Primary Examiner